United States Patent
Richardson et al.

(10) Patent No.: US 9,708,069 B2
(45) Date of Patent: Jul. 18, 2017

(54) RAM AIR SYSTEM AND METHODS OF MANUFACTURING THE SAME

(71) Applicant: The Boeing Company, Huntington Beach, CA (US)

(72) Inventors: Marcus K. Richardson, Bothell, WA (US); Michael James Tonks, Snohomish, CA (US); Colin W. Hart, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/675,807

(22) Filed: Apr. 1, 2015

(65) Prior Publication Data

US 2016/0288912 A1    Oct. 6, 2016

(51) Int. Cl.
 *B64D 13/06* (2006.01)
 *B64D 13/00* (2006.01)
 *F01P 1/00* (2006.01)
(52) U.S. Cl.
 CPC .............. *B64D 13/06* (2013.01); *B64D 13/00* (2013.01); *B64D 13/006* (2013.01); *F01P 1/00* (2013.01); *B64C 2230/00* (2013.01); *Y02T 50/166* (2013.01); *Y02T 50/44* (2013.01)
(58) Field of Classification Search
 CPC .......... B64D 41/007; B64D 2013/0618; B64D 2013/0644; B64D 2013/0648; B64D 13/006

See application file for complete search history.

(56) References Cited

U.S. PATENT DOCUMENTS

| | | | |
|---|---|---|---|
| 6,434,968 B2 | 8/2002 | Buchholz et al. | |
| 7,232,097 B2* | 6/2007 | Noiseux | A62C 2/14 165/122 |
| 7,337,605 B2* | 3/2008 | Hagshenas | B64D 33/08 244/58 |
| 7,364,116 B2* | 4/2008 | Nguyen | B64D 41/00 244/58 |
| 2002/0152765 A1* | 10/2002 | Sauterleute | B64D 13/00 62/401 |
| 2006/0067833 A1* | 3/2006 | McAuliffe | B64D 13/02 417/43 |

(Continued)

FOREIGN PATENT DOCUMENTS

DE    10244199 A1    4/2004

OTHER PUBLICATIONS

Extended European Search Report for Application No. 16156642.7, Aug. 26, 2016, 9 pages.

*Primary Examiner* — Brian M O'Hara
(74) *Attorney, Agent, or Firm* — Armstrong Teasdale LLP (57) ABSTRACT

A ram air system includes a bay comprising an exterior wall defining an interior volume that at least partially encloses a ram air duct. The ram air duct includes an outlet configured to discharge an exhaust airflow at a first temperature. At least one of the exterior wall and the ram air duct defines an aperture therein providing for flow communication between the bay interior volume and the exhaust airflow such that cooling air flows from the interior volume to form a boundary layer between the exhaust airflow and the exterior wall downstream of the outlet. The boundary layer is at a second temperature that is lower than the first temperature.

20 Claims, 7 Drawing Sheets

(56) References Cited

U.S. PATENT DOCUMENTS

| | | |
|---|---|---|
| 2010/0258675 A1 | 10/2010 | Scherer et al. |
| 2011/0111683 A1 | 5/2011 | Kelnhofer |
| 2011/0151763 A1 | 6/2011 | Selchert et al. |
| 2013/0160472 A1 | 6/2013 | Klimpel et al. |

* cited by examiner

RAM AIR SYSTEM AND METHODS OF MANUFACTURING THE SAME

BACKGROUND

The implementations described herein relate generally to aircraft ram air systems, and, more specifically, to an aircraft ram system that is capable of providing cooling to multiple components of the aircraft.

At least some known aircraft include a ram air system that provides ram air to at least one air conditioning (A/C) pack of an aircraft environmental control system (ECS). At least some ram air systems and A/C packs are both positioned within a pack bay of the aircraft, along with other aircraft components. The A/C pack generates heat during operation and discharges the heat into the pack bay and ram exhaust, while supplying cool air to the cabin. The heated air within the pack bay may cause an undesirable increase in temperature of the components within the pack bay and also the surrounding aircraft structure. For example, at least some aircraft include fuel tanks located proximate the pack bay. As such, an increase in pack bay temperature may cause an undesirable increase in fuel temperature. At least some aircraft include an insulation layer between the pack bay and the fuel tanks to reduce fuel heating. However, such insulation increases the overall weight of the aircraft and may require replacement.

The ram air system provides cooling air to the A/C packs, and, more specifically, to a heat exchanger of the A/C pack. As such, the temperature of the exhaust flow of the ram air system is higher compared to the temperature of the inlet flow of ram air into the system and also the free stream airflow. In at least some aircraft, the exhaust from the ram air system flows along downstream skin panels of the aircraft. Continuous exposure to this high temperature ram air exhaust flow may cause unscheduled maintenance of the downstream panels or limit the service lifetime of such panels, especially in the case of carbon fiber panels. At least some known aircraft include a heat shield built into the skin panels downstream of the ram air exhaust. Such heat shields may be simply a thicker, more robust, skin panel, or may include an insulation core to insulate the skin from the hot exhaust flow. In either case, the heat shield may be quite large and relatively heavy as compared to a standard skin panel. Accordingly, such heat shields increase the overall weight of the aircraft and also the manufacturing costs.

BRIEF DESCRIPTION

In one aspect, a ram air system for use with a bay comprising an exterior wall defining an interior volume is provided. The ram air system includes a ram air duct at least partially enclosed within the interior volume. The ram air duct includes an outlet configured to discharge an exhaust airflow at a first temperature. At least one of the exterior wall and the ram air duct defines an aperture therein providing for flow communication between the bay interior volume and the exhaust airflow such that cooling air flows from the interior volume to form a boundary layer between the exhaust airflow and the exterior wall downstream of the outlet. The boundary layer is at a second temperature that is lower than the first temperature.

In another aspect, a method of manufacturing a ram air system for use in a bay having an interior volume at least partially defined by an exterior wall of the bay is provided. The method includes at least partially enclosing a ram air duct within the interior volume and defining an outlet of the ram air duct in the exterior wall such that the outlet is configured to discharge an exhaust airflow at a first temperature. An aperture is defined in at least one of the exterior wall and the ram air duct to provide for flow communication between the bay interior volume and the exhaust airflow such that cooling air flows from the interior volume to form a boundary layer between the exhaust airflow and the exterior wall downstream of the outlet. The boundary layer is at a second temperature that is lower than the first temperature.

In yet another aspect, an aircraft is provided. The aircraft includes a lower lobe portion including a bay having an exterior wall that defines an interior volume. The aircraft also includes a ram air system at least partially positioned in the lower lobe and comprising a ram air duct. The ram air duct includes an outlet defined in the exterior wall and configured to discharge an exhaust airflow at a first temperature. At least one of the exterior wall and the ram air duct defines an aperture therein providing for flow communication between the bay interior volume and the exhaust airflow such that cooling air flows from the interior volume to form a boundary layer between the exhaust airflow and the exterior wall downstream of the outlet. The boundary layer is at a second temperature that is lower than the first temperature.

DETAILED DESCRIPTION

Described herein is an exemplary ram air system that facilitates forming a boundary layer of cooling air between an exterior skin of an aircraft and a relatively hot ram air exhaust flow. Such film cooling produced by the boundary layer insulates the skin from the hot exhaust flow and enables a reduction in size or elimination of a heat shield found on at least some known ram air systems. As such, the weight of the aircraft and the manufacturing costs thereof are both reduced. Moreover, at least one implementation of the ram air system is a passive system that provides for formation of the boundary layer without requiring additional components, such as fans, or additional electrical or hydraulic power from the aircraft. Other implementations of the ram air system include a door coupled proximate an aperture from which the cool air is discharged. The door is selectively movable based on a signal from at least one sensor to control an amount of cooling air channeled therethrough. Furthermore, the implementations described herein include a pack bay opening that allows cool air from a free stream airflow into the interior volume of the pack bay. The cool air facilitates reducing the temperatures of aircraft components within the pack bay and also those components proximate the pack bay. As such, layers of insulation between the pack bay components can be reduced or eliminated, thus further reducing the weight and costs of aircraft maintenance.

Figure 1:
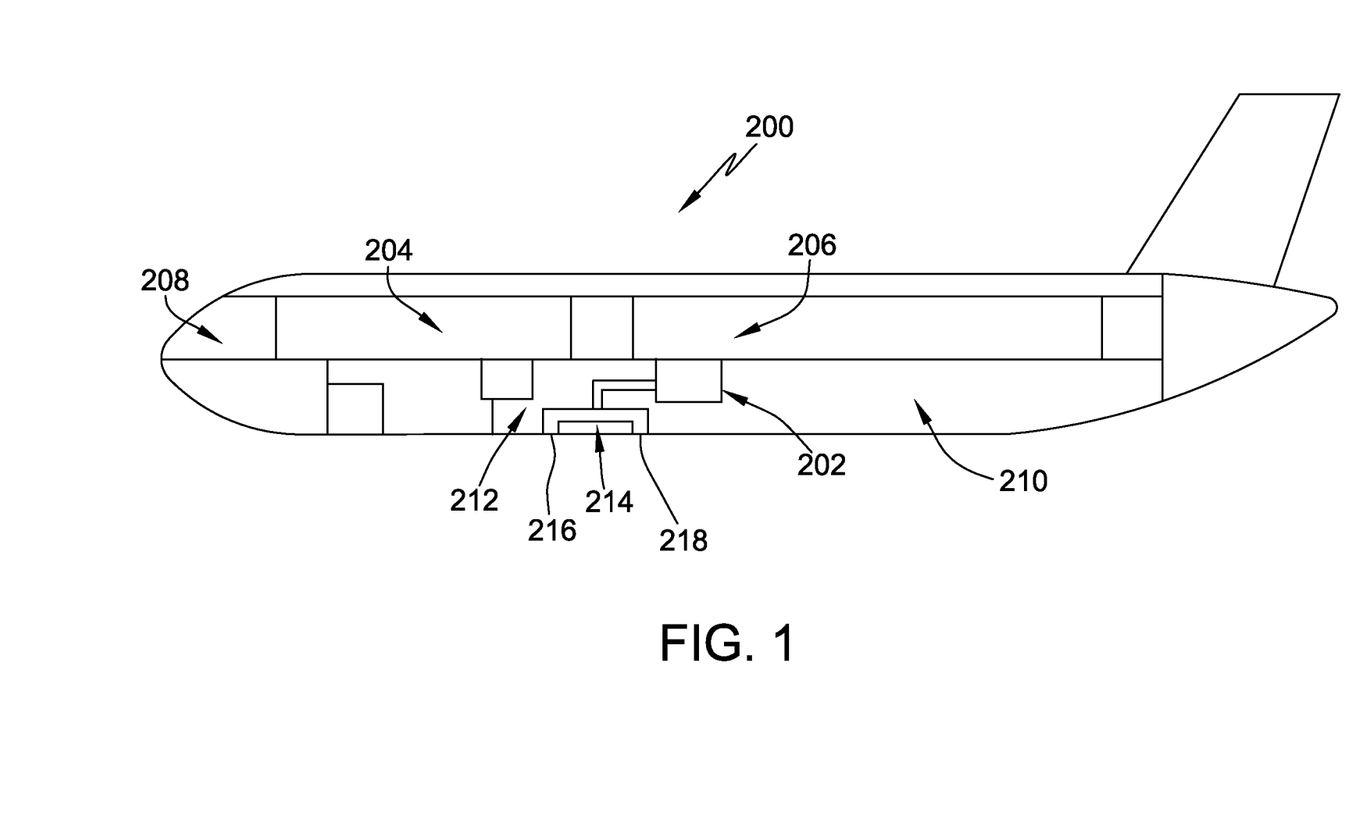
FIG. 1 is a schematic view of an aircraft illustrating a cabin area, a stowage compartment, and an air conditioning system.

Referring to FIG. 1, there is shown a mobile platform or aircraft 200 that includes an air conditioning system 202. Aircraft 200 includes various pressurized areas that have a constant influx of air for passenger and crew comfort. In the exemplary implementation, such pressurized areas can include a first passenger cabin 204, a second passenger cabin 206, a cockpit area 208, and a stowage area 210 often referred to as the "lower lobe". Air conditioning system 202 is housed at least partially within the pressurized areas and a non-pressurized area of aircraft 200. The non-pressurized area is referred to herein as a pack bay 212 of lower lobe 210. Pack bay 212 includes a ram air system 214 that facilitates providing cooling air to the A/C pack heat exchanger.

Figure 2:
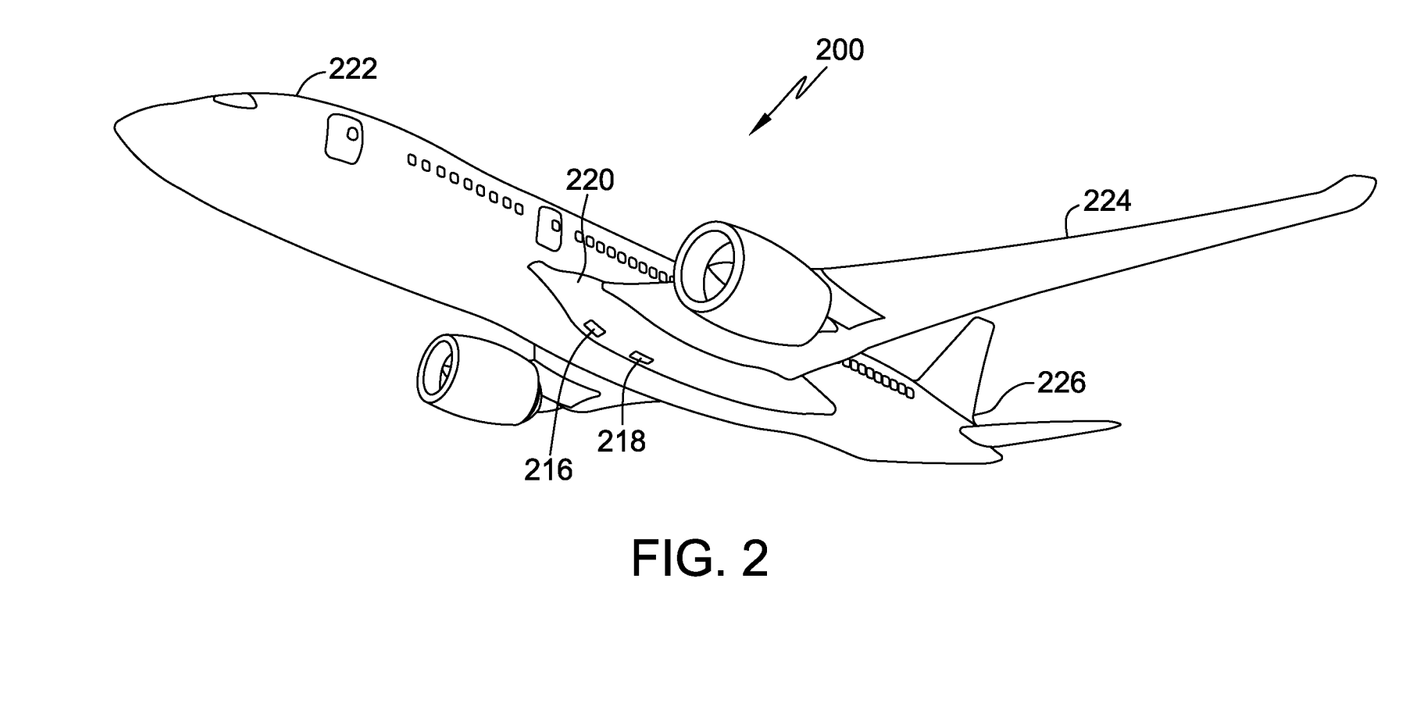
FIG. 2 is a bottom isometric view of the aircraft shown in FIG. 1 illustrating a ram air system with a ram air inlet and a ram air outlet.

FIG. 2 is a bottom isometric view of aircraft 200 illustrating a ram air inlet 216 and a ram air outlet 218 of ram air system 214 (shown in FIG. 1). In the exemplary implementation, ram air inlet 216 is positioned on an underside of a wing-to-body fairing 220, and ram air outlet 218 is positioned aft of ram air inlet 216. In another suitable implementation, ram air inlet 216 and/or ram air outlet 218 are located on other portions of aircraft 200. For example, in other implementations, ram air inlet 216 is positioned in a positive pressure region of a fuselage 222, or in a similar region of a wing 224 or an empennage 226. Although only one ram air inlet 216 and one ram air outlet 218 are shown in FIGS. 1 and 2, aircraft 200 may include additional ram air inlets and ram air outlets.

Figure 3:
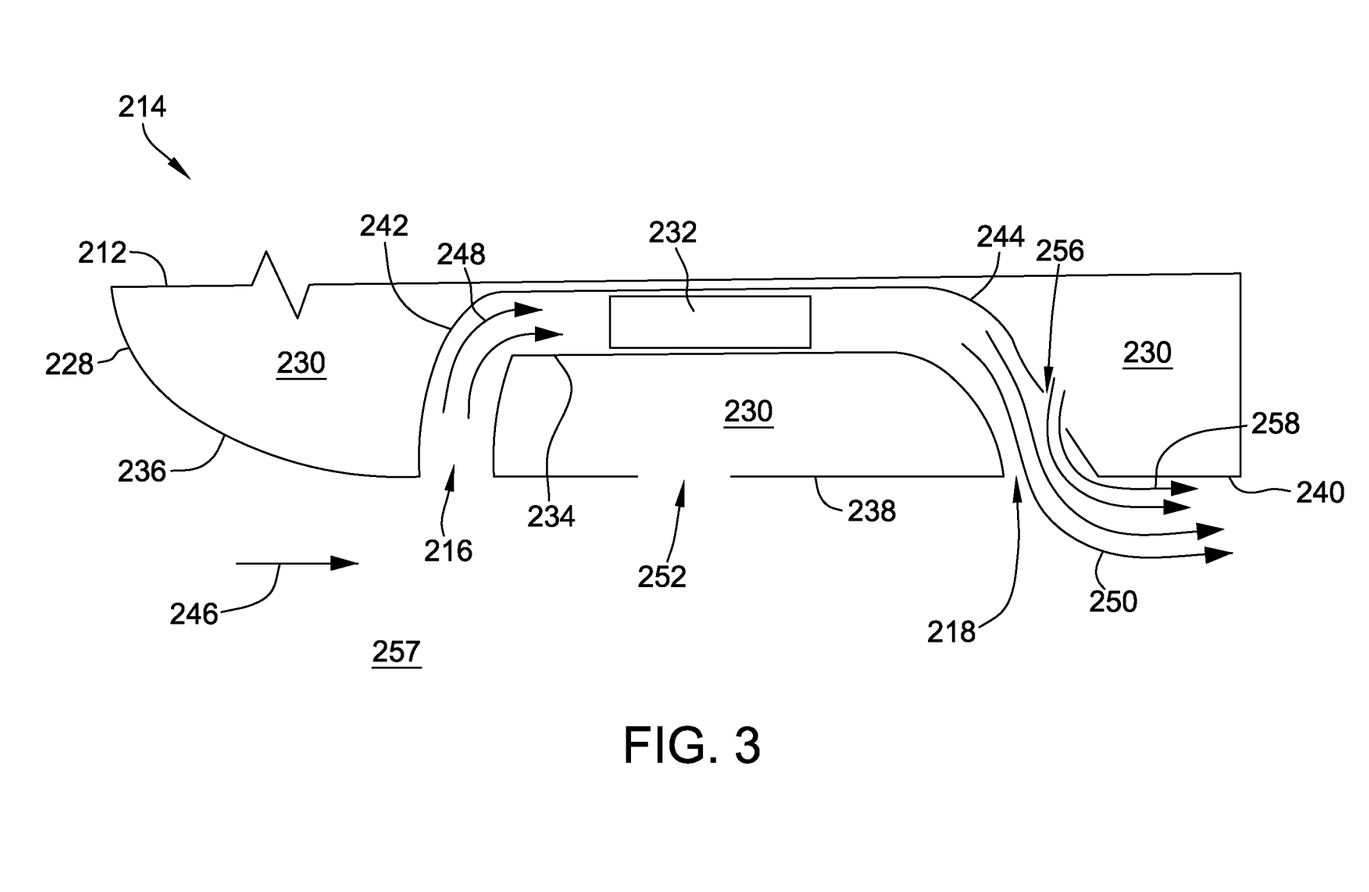
FIG. 3 is a side view of an exemplary passive ram air system that may be used with the aircraft shown in FIG. 2.

FIG. 3 is a side view of pack bay 212 within lower lobe 210 of aircraft 200 (shown in FIG. 2). In the exemplary implementation, pack bay 212 includes an exterior wall 228 that defines an interior pack bay volume 230. Pack bay 212 also includes at least one heat source 232, such as an A/C pack heat exchanger, and ram air system 214. In the exemplary implementation, ram air system 214 provides cooling air to air conditioning system 202 (shown in FIG. 1) for cooling heat source 232. Ram air system 214 includes a ram air duct 234 having upstream inlet 216 and downstream outlet 218. Ram air duct 234 is at least partially enclosed within pack bay volume 230. Ram air system 214 divides exterior wall 228 into three portions: an upstream portion 236 located upstream of inlet 216, an intermediate portion 238 located between inlet 216 and outlet 218, and a downstream portion 240 located downstream of outlet 218. As used herein, "upstream" and "downstream" are used to describe directions with respect to a free stream airflow along aircraft 200.

In the exemplary implementation, ram air duct 234 also includes an upstream portion 242, defined between inlet 216 and heat source 232, and a downstream portion 244 defined between heat source 232 and outlet 218. In operation, air from a free stream airflow 246 flows into inlet 216, through upstream portion 242, past heat source 232, through downstream portion 244, and is exhausted through outlet 218. The portion of the airflow through ram air system within upstream portion 242 is referred to as inlet airflow 248, and the portion of the airflow through downstream portion 244 is referred to as exhaust airflow 250. When inlet airflow 248 flows past heat source 232, heat from source 232 is transferred to the air to be channeled from pack bay 212 in exhaust airflow 250. As such, the temperature of free stream airflow 246 and inlet airflow 248 is relatively low when compared to the temperature of heat source 232 and exhaust airflow 250. However, additional cooling of pack bay 212 is desirable.

In the exemplary implementation, ram air system 214 includes at least one opening 252 for coupling interior volume 230 of pack bay 212 in flow communication with an exterior environment 257 having free stream airflow 246. In one embodiment, shown in FIG. 3, pack bay exterior wall 228 includes opening 252 to enable air from free stream airflow 246 to enter pack bay interior volume 230. More specifically, opening 252 is defined in at least one of upstream portion 236 and intermediate portion 238 of pack bay exterior wall 228. In another suitable implementation, opening 252 is formed in upstream portion 242 of ram air duct 234 between inlet 216 and heat source 232. Generally, opening 252 may be formed at any location that enables ram air system to operate as described herein. Additionally, although FIG. 3 illustrates only a single opening 252, ram air system 214 may include a plurality of openings 252 that each couple interior 230 in flow communication with exterior 257. In such embodiments, ram air system may include a panel having a plurality of perforations arranged in a pattern to facilitate introducing a maximum amount of air into volume 230.

In operation, opening 252 couples exterior environment 257 in flow communication with pack bay interior volume 230 to enable air from free stream airflow 246 to enter pack bay volume 230. Accordingly, the relatively cool air from free stream airflow 246 lowers the temperature of volume 230 and facilitates maintaining the temperature of aircraft components within and proximate to pack bay 212, such as heat source 232 and fuel tanks, within a desired range while reducing or eliminating the need for insulation.

In the exemplary implementation, ram air system 214 also includes an aperture 256 that couples pack bay interior 230 in flow communication with exhaust airflow 250. More specifically, as shown in FIG. 3, aperture 256 is defined upstream from, although proximate to, outlet 218 in downstream portion 244 of ram air duct 234. In another suitable implementation, aperture 256 is defined proximate outlet 218 in downstream portion 240 of pack bay exterior wall 228. Because hot exhaust airflow 250 is at a lower pressure than the relatively cooler air inside pack bay volume 230, exhaust airflow 250 pulls the cooler air from volume 230 through aperture 256 as exhaust airflow passes over aperture 256. The cooler air from volume 230 creates a boundary layer 258 between exhaust airflow 250 and components of aircraft 200 downstream of aperture 256. In the exemplary implementation, air from volume 230 is pulled through aperture 256 in duct 234 such that the cooler air forms boundary layer 258 between exhaust airflow 250 and a portion of duct 234 downstream of aperture 256. As exhaust airflow 250 and boundary layer 258 exit outlet 218, free stream airflow 246 turns both exhaust airflow 250 and boundary layer 258 in the downstream direction, that is, in an aft direction toward empennage 226 (shown in FIG. 2), such that boundary layer 258 remains between exhaust airflow 250 and downstream portion 240 of pack bay exterior wall 228.

In another suitable implementation, aperture 256 is defined in downstream portion 240 of exterior wall 228 just downstream of outlet 218 to form boundary layer 258 between exhaust flow 250 and downstream portion 240. Generally, it is preferable to define aperture 256 at a lowest pressure region along duct 234 and/or portion 240 where the pressure differential between exhaust flow 250 and the air within pack bay volume 230 is the greatest to facilitate maximizing the amount of air pulled from volume 230 to form boundary layer 258.

Accordingly, boundary layer 258 provides a layer of insulating air between exhaust airflow 250 and downstream portion 240 of exterior wall 228 to protect exposure of downstream portion 240 to the relatively high temperature exhaust airflow 250. Additionally, the air within pack bay volume 230 is continuously recirculated by air entering volume 230 through opening 252 and then exiting volume 230 though aperture 256. As such, the recirculating air continuously removes heat from pack bay 212 and provides cool air to aircraft 200 components within and proximate to pack bay 212, such as heat source 232 and fuel tanks.

In the implementation shown in FIG. 3, ram air system 214 is a passive system such that opening 252 and aperture 256 are in an always opened condition that facilitates continuously providing cool air to pack bay volume 230 and a continuous boundary layer 258 formation to protect exterior wall 228 from hot exhaust airflow 250.

Figure 4:
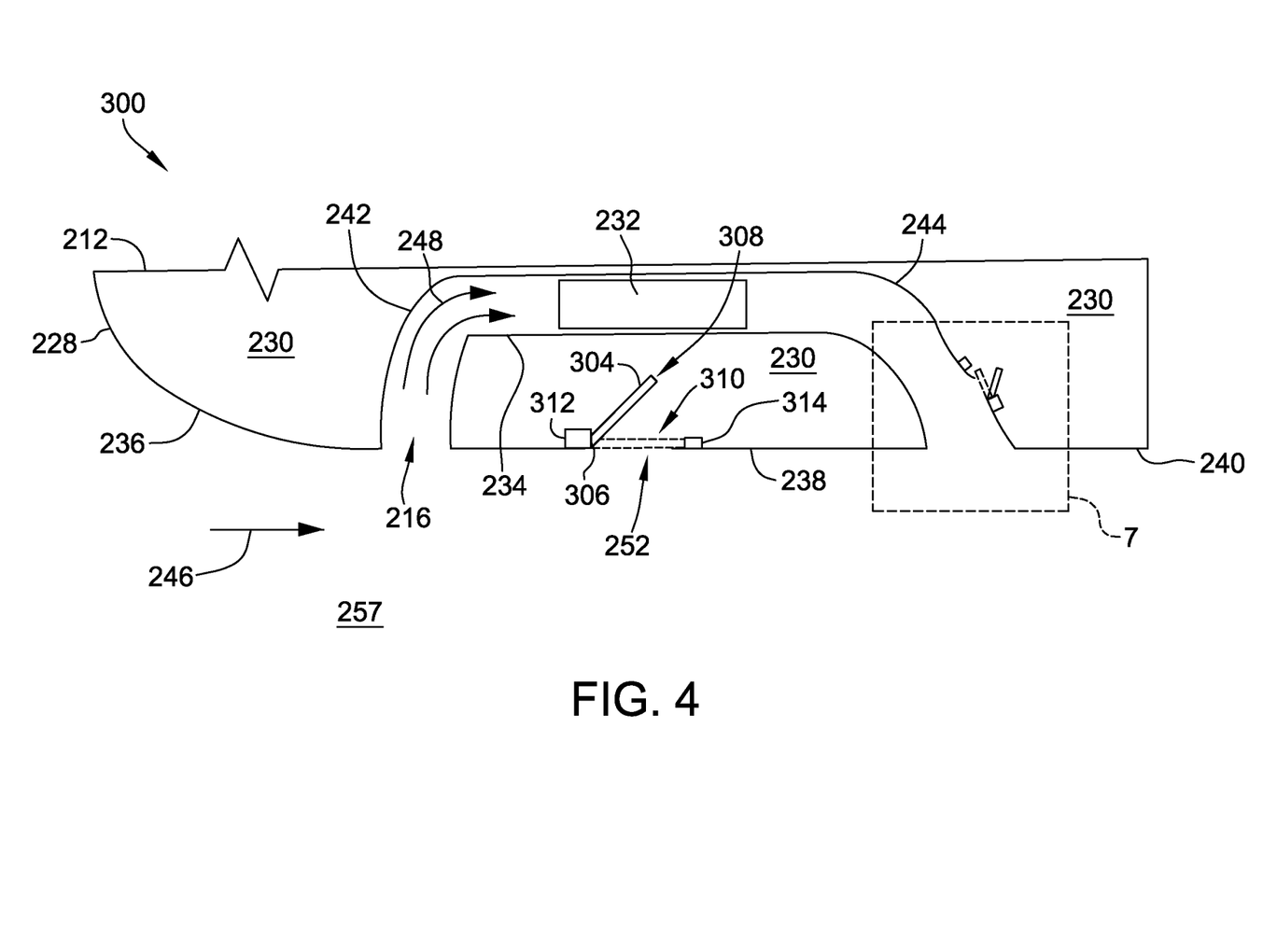
FIG. 4 is a side view of an exemplary active ram air system that may be used with the aircraft shown in FIG. 2.
Figure 5:
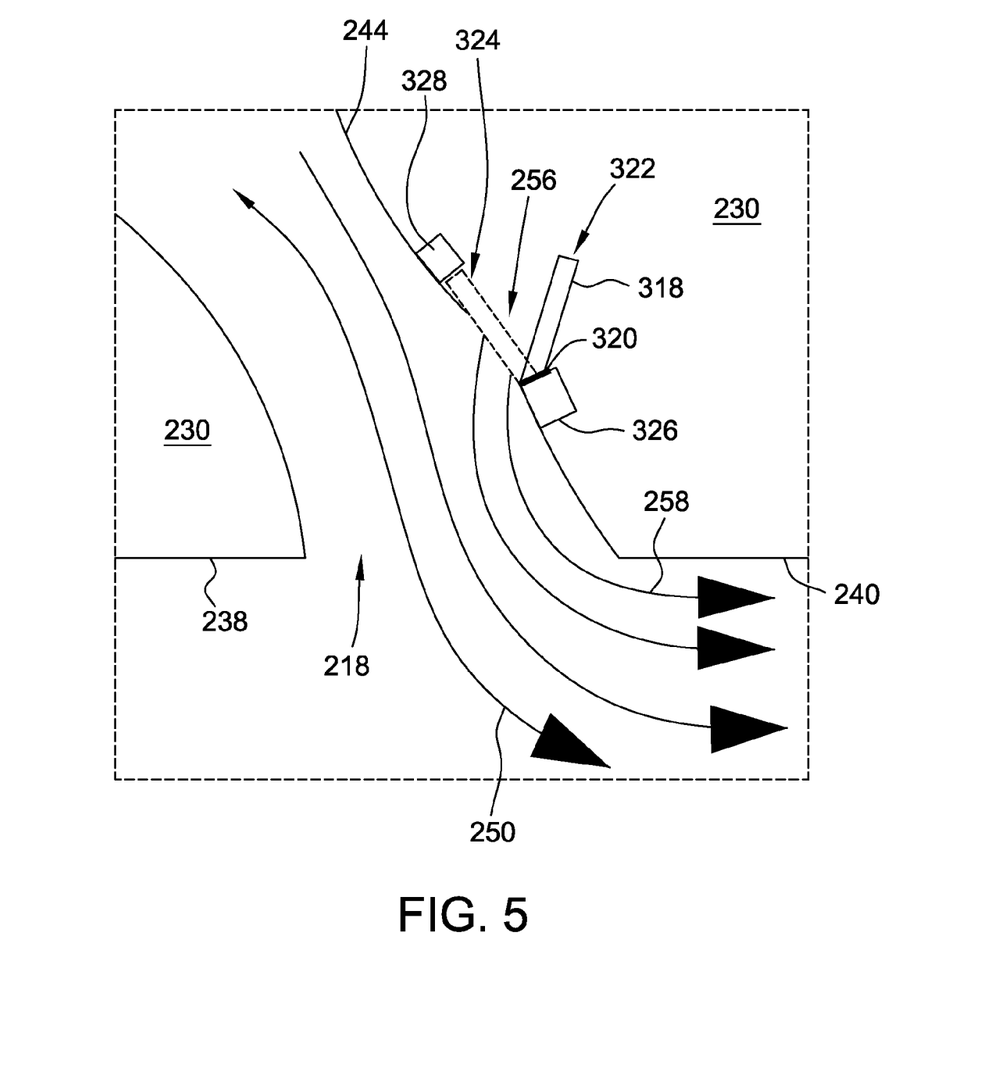
FIG. 5 is an enlarged view of the active ram air system taken along line 7 shown in FIG. 4.
Figure 6:
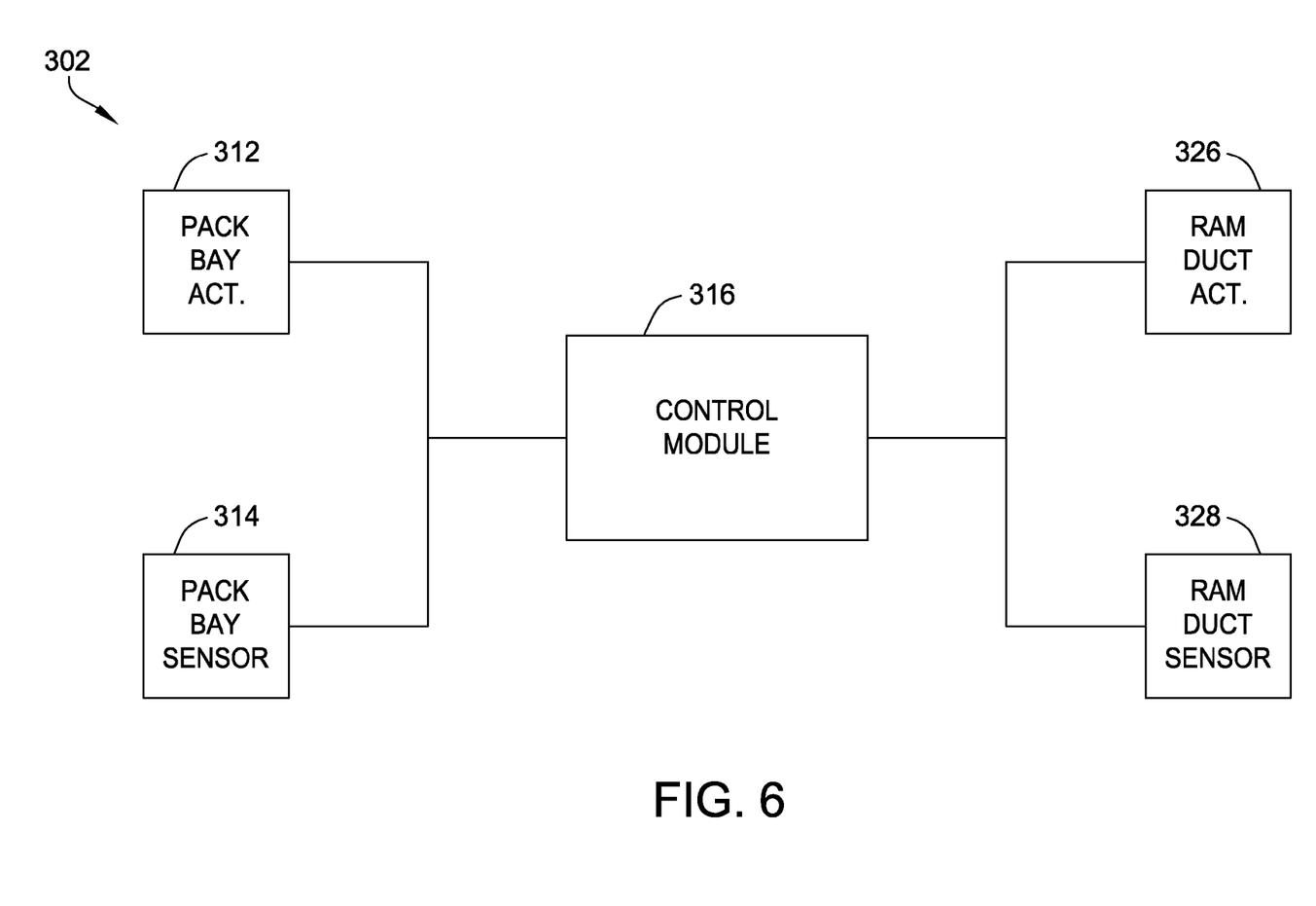
FIG. 6 is a schematic diagram of a control system that may be used to control the active ram system shown in FIG. 4.

FIG. 4 is a side view of an active ram air system 300 that may be used with aircraft 200 (shown in FIG. 2). FIG. 5 is an enlarged view of active ram air system 300 taken along line 7 (shown in FIG. 4), and FIG. 6 is a schematic diagram of a control system 302 that may be used to control active ram system 300 (shown in FIG. 4). FIGS. 4 and 5 illustrate an active ram air system 300 for use in aircraft 200 (shown in FIG. 2). Ram air system 300 is substantially similar to ram air system 214, with the exception that ram air system 300 is an actively controlled system, whereas ram air system 214 is a passive system. As such, components common to both systems 214 and 300 are shown in FIGS. 4 and 5 as labeled with the same reference numbers used in FIG. 3 for ram air system 214.

In the exemplary implementation, ram air system 300 is an actively controlled system that enables opening 252 and aperture 256 to be selectively opened and closed according to predetermined conditions, such as, but not limited to, the sensing of a predetermined altitude, temperature, and/or pressure. More specifically, ram air system 300 includes a first door 304 positioned proximate opening 252 in exterior pack bay wall 228. First door 304 is pivotally coupled about an axis 306 to exterior wall 228 within volume 230. First door 304 is selectively movable between an open position 308 and a closed position 310 (shown in broken lines), and to positions between positions 308 and 310, by an actuator 312. In the exemplary implementation, ram air system 300 also includes a sensor 314 positioned proximate opening 252. Alternatively, sensor 314 may be positioned at any location that facilitates operation of ram air system 300 as described herein. Sensor 314 is configured to detect the occurrence of a predetermined condition. In the exemplary implementation, sensor 314 is at least one of a temperature sensor, a pressure sensor, and an altitude sensor. Alternatively, sensor 314 may be any type of sensor that facilitates operation of ram air system 300 as described herein.

In operation, sensor 314 detects the occurrence of a predetermined condition and transmits a signal to a control module 316 (shown in FIG. 6) of control system 302. Control module 316 is communicatively coupled to sensor 314 and to actuator 312. As such, control module 316 relays a subsequent signal to actuator 312 to control movement of door 304 based on the initial signal from sensor 314. In one implementation, sensor 314 and actuator 312 are independent components of ram air system 300, and actuator 312 is one of a mechanical, electrical, or hydraulic actuator that is controlled by control module 316. In another suitable implementation, sensor 314 and actuator 312 are integrated into a single component.

Referring now to FIG. 5, ram air system 300 also includes a second door 318 positioned proximate aperture 256 in ram air duct 234. Second door 318 is pivotally coupled about an axis 320 to ram air duct 234 within volume 230. In another implementation, when opening 256 is defined in downstream portion 240, second door 318 is coupled to downstream portion 240 to selectively cover opening 256. Although ram air system 300 is described herein as having both first and second doors 304 and 318, it is contemplated that certain implementations of ram air system 300 include only one of doors 304 and 318. In such implementations, whichever of opening 252 and aperture 256 is not selectively covered by a door operates in a similar manner as passive ram air system 214 described above.

Similar to door 304, as described above, second door 318 is selectively movable between an open position 322 and a closed position 324 (shown in broken lines), and to positions between positions 322 and 324, by an actuator 326. In the exemplary implementation, ram air system 300 also includes a sensor 328 positioned proximate opening 256. Alternatively, sensor 328 may be positioned at any location that facilitates operation of ram air system 300 as described herein. Similar to sensor 314, as described above, sensor 328 is configured to detect the occurrence of a predetermined condition. In the exemplary implementation, sensor 328 is at least one of a temperature sensor, a pressure sensor, and an altitude sensor. Alternatively, sensor 328 may be any type of sensor that facilitates operation of ram air system 300 as described herein.

In operation, sensor 328 detects the occurrence of a predetermined condition and transmits a signal to control module 316 of control system 302. Control module 316 is communicatively coupled to sensor 328 and to actuator 326. As such, control module 316 relays a subsequent signal to actuator 326 to control movement of door 318 based on the initial signal from sensor 328. In one implementation, sensor 328 and actuator 326 are independent components of ram air system 300, and actuator 326 is one of a mechanical, electrical, or hydraulic actuator that is controlled by control module 316. In another suitable implementation, sensor 328 and actuator 326 are integrated into a single component Door 318 is selectively movable to position 322 and 324, and any positioned between positions 322 and 324, to control an amount of cooling air that is pulled through aperture 256 to form boundary layer 258 between exhaust airflow 250 and downstream portion 240 of pack bay exterior wall 228. Certain operating conditions of aircraft 200, during take-off and landing and during cruise, for example, may require different amounts of cooling air from pack bay volume 230 to form boundary layer 258. Ram air system 300 having door 318, actuator 326 and sensor 328, along with control system 302 facilitates controlling the amount of air channeled through aperture 256 to optimize boundary layer 258 formation.

Also described herein is a method of manufacturing a ram air system for use in a bay having an interior volume at least partially defined by an exterior wall of the bay. The method includes at least partially enclosing a ram air duct within the interior volume and defining an outlet of the ram air duct in the exterior wall such that the outlet configured to discharge an exhaust airflow at a first temperature. The method also includes defining an aperture in at least one of the exterior wall and the ram air duct to provide for flow communication between the bay interior volume and the exhaust airflow.

The aperture enables cooling air to flow from the interior volume of the pack bay to form a boundary layer between the exhaust airflow and the exterior wall downstream of the outlet. Because the boundary layer is at a second temperature that is lower than the first temperature of the hot exhaust airflow, the boundary layer protects the exterior skin from exposure to the hot exhaust airflow.

In one implementation, the method includes defining the aperture in the ram air duct proximate the duct outlet. In another implementation, the method includes defining the aperture at a lowest pressure region of the ram air duct or the bay.

The method described herein also includes defining an opening in the exterior wall upstream of the exhaust outlet to provide for flow communication between the interior volume of the bay and a free stream airflow. As described above, the opening allows relatively cool free stream air to enter the bay and provide cooling to components housed within the bay and those components proximate the bay.

When an actively controlled ram air system is desired, the method includes at least one of coupling a first door to the exterior wall proximate the opening into the bay and coupling a second door to the ram air duct or exterior wall proximate the aperture that connects the bay interior volume and the ram air duct in flow communication. Additionally, a control system is communicatively coupled to each of the doors such that the control system is configured to control an amount of cooling air through the aperture and the opening. Furthermore, at least one sensor is coupled in communication with the control system. In operation, a position of the doors are controlled based on a signal from the at least one sensor to the control system.

Figure 7:
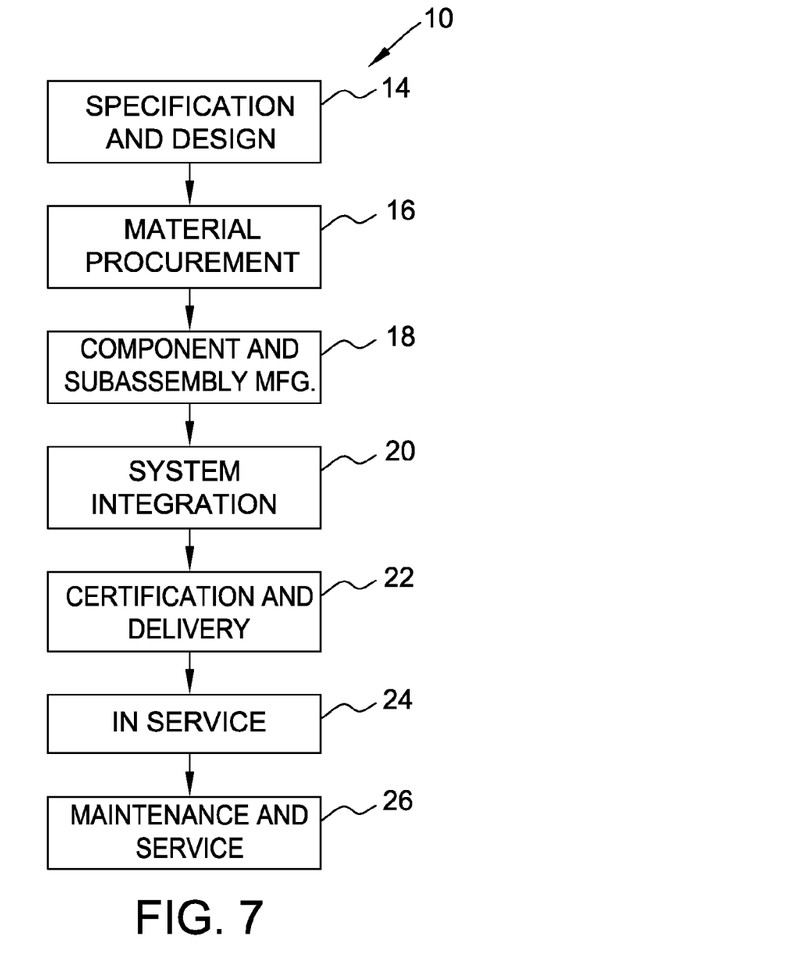
FIG. 7 is a flow diagram of an exemplary aircraft production and service methodology.
Figure 8:
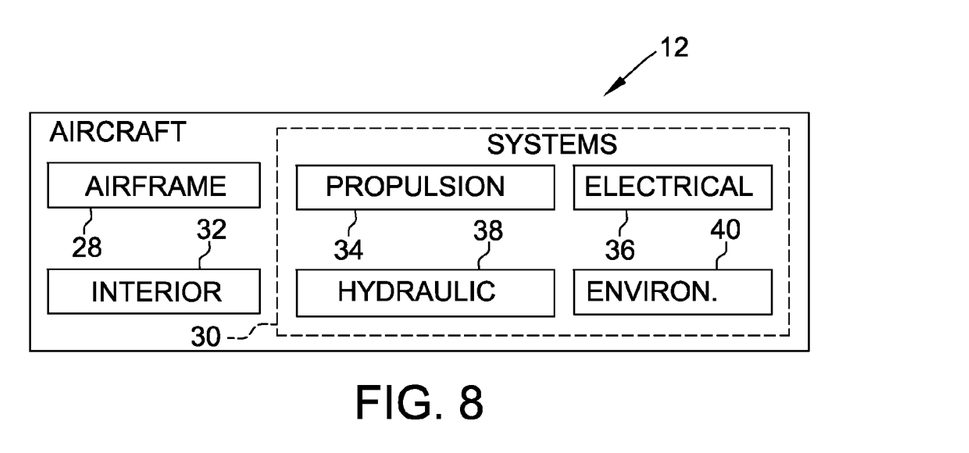
FIG. 8 is a block diagram of an exemplary aircraft.

Referring to FIG. 7, implementations of the disclosure may be described in the context of an aircraft manufacturing and service method 10 and via an aircraft 12 (shown in FIG. 8). During pre-production, including specification and design 14 data of aircraft 12 may be used during the manufacturing process and other materials associated with the airframe may be procured 16. During production, component and subassembly manufacturing 18 and system integration 20 of aircraft 12 occurs, prior to aircraft 12 entering its certification and delivery process 22. Upon successful satisfaction and completion of airframe certification, aircraft 12 may be placed in service 24. While in service by a customer, aircraft 12 is scheduled for periodic, routine, and scheduled maintenance and service 26, including any modification, reconfiguration, and/or refurbishment, for example. In alternative implementations, manufacturing and service method 10 may be implemented via vehicles other than an aircraft.

Each portion and process associated with aircraft manufacturing and/or service method 10 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, aircraft 12 produced via method 10 may include an airframe 28 having a plurality of systems 30 and an interior 32. Examples of high-level systems 30 include one or more of a propulsion system 34, an electrical system 36, a hydraulic system 38, and/or an environmental system 40. Any number of other systems may be included.

Apparatus and methods embodied herein may be employed during any one or more of the stages of method 10. For example, components or subassemblies corresponding to component production process 18 may be fabricated or manufactured in a manner similar to components or subassemblies produced while aircraft 12 is in service. Also, one or more apparatus implementations, method implementations, or a combination thereof may be utilized during the production stages 18 and 20, for example, by substantially expediting assembly of, and/or reducing the cost of assembly of aircraft 12. Similarly, one or more of apparatus implementations, method implementations, or a combination thereof may be utilized while aircraft 12 is being serviced or maintained, for example, during scheduled maintenance and service 26.

As used herein, the term "aircraft" may include, but is not limited to, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

The implementations of the ram air system described herein facilitate forming a boundary layer of cooling air between the exterior skin of an aircraft and the relatively hot ram air exhaust flow. Such film cooling produced by the boundary layer insulates the skin from the hot exhaust flow and enables a reduction in size or elimination of a heat shield found on at least some known ram air systems. As such, the weight of the aircraft and the manufacturing costs thereof are both reduced. Moreover, at least one implementation of the ram air system is a passive system that provides for formation of the boundary layer without requiring additional components, such as fans, or additional electrical or hydraulic power from the aircraft. Other implementations of the ram air system include a door coupled proximate the aperture from which the cool air is discharged. The door is selectively movable based on a signal from at least one sensor to control an amount of cooling air channeled therethrough. Furthermore, the implementations described herein include a pack bay opening that allows cool air from the free stream airflow into the interior volume of the pack bay. The cool air facilitates reducing the temperatures of aircraft components within the pack bay and also those components proximate the pack bay. As such, layers of insulation between the pack bay components can be reduced or eliminated, thus further reducing the weight and costs of aircraft maintenance.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A ram air system for use with a bay of an aircraft, the aircraft includes a fuselage skin having an exterior wall defining an interior volume of the bay, the ram air system comprising:

a ram air duct at least partially enclosed within the interior volume, the ram air duct comprising an outlet configured to discharge an exhaust airflow to an exterior environment at a first temperature; and an aperture defined in at least one of said exterior wall and said ram air duct, the aperture configured to provide flow communication directly between the bay interior volume and the exhaust airflow, said aperture configured to discharge cooling air airflow to the exterior environment from the interior volume such that a boundary layer of cooling air is formed between the exhaust airflow and said exterior wall of the aircraft downstream of said outlet, the boundary layer being at a second temperature that is lower than the first temperature of the exhaust airflow.

2. The ram air system in accordance with claim 1, wherein said aperture is defined in said ram air duct proximate said outlet.

3. The ram air system in accordance with claim 1, wherein a pressure of the exhaust airflow is lower than a pressure of the cooling air such that the cooling air is pulled through said aperture to form the boundary layer.

4. The ram air system in accordance with claim 1, wherein said aperture is defined at a lowest pressure region of said ram air duct.

5. The ram air system in accordance with claim 1, wherein said exterior wall comprises at least one opening defined therein providing for flow communication between the interior volume of said bay and a free stream airflow.

6. The ram air system in accordance with claim 5, wherein said opening is defined in said exterior wall upstream of said ram air duct outlet.

7. A method of manufacturing a ram air system for use in a bay having an interior volume at least partially defined by an exterior wall of a fuselage skin of an aircraft, said method comprising:
    at least partially enclosing a ram air duct within the interior volume;
    defining an outlet of the ram air duct in the exterior wall, the outlet configured to discharge an exhaust airflow to an exterior environment at a first temperature; and
    defining an aperture in at least one of the exterior wall and the ram air duct to provide for flow communication directly between the bay interior volume and the exhaust airflow, the aperture configured to discharge cooling air airflow to the exterior environment from the interior volume such that a boundary layer of cooling air is formed between the exhaust airflow and the exterior wall of the aircraft downstream of the outlet, the boundary layer being at a second temperature that is lower than the first temperature of the exhaust airflow.

8. The method in accordance with claim 7, wherein defining an aperture in at least one of the exterior wall and the ram air duct comprises defining an aperture in the ram air duct proximate the outlet.

9. The method in accordance with claim 7, wherein defining an aperture in at least one of the exterior wall and the ram air duct comprises defining an aperture at a lowest pressure region of the ram air duct.

10. The method in accordance with claim 7 further comprising defining an opening in the exterior wall upstream of the outlet to provide for flow communication between the interior volume of said bay and a free stream airflow.

11. The method in accordance with claim 7 further comprising coupling a door to the exterior wall proximate the aperture.

12. The method in accordance with claim 11 further comprising coupling a control system in communication with the door, the control system configured to selectively position the door to control an amount of cooling air through the aperture.

13. An aircraft comprising:
    a fuselage having a lower lobe portion comprising a bay comprising an exterior wall that defines an interior volume;
    a ram air system at least partially positioned in said lower lobe, said ram air system comprising a ram air duct at least partially enclosed within the interior volume, said ram air duct comprising an outlet defined in said exterior wall configured to discharge an exhaust airflow to an exterior environment at a first temperature; and
    wherein at least one of said exterior wall and said ram air duct defines an aperture therein providing for flow communication directly between the bay interior volume and the exhaust airflow, said aperture configured to discharge cooling air airflow to the exterior environment from the interior volume such that a boundary layer of cooling air is formed between the exhaust airflow and the exterior wall downstream of said outlet, the boundary layer being at a second temperature that is lower than the first temperature of the exhaust airflow.

14. The aircraft in accordance with claim 13, wherein said aperture is defined in said ram air duct proximate said outlet.

15. The aircraft in accordance with claim 13, wherein said exterior wall comprises at least one opening defined upstream of said ram air duct outlet, said opening providing for flow communication between the interior volume of said bay and a free stream airflow.

16. The aircraft in accordance with claim 13 further comprising:
    a door coupled to said exterior wall proximate said aperture;
    a control system configured to selectively position said door to control an amount of cooling air through said aperture; and
    at least one sensor communicatively coupled to said control system, wherein a position of said door is controlled based on a signal from said at least one sensor.

17. The ram air system in accordance with claim 1, wherein said ram air duct comprises an inlet opposite said outlet, wherein said ram air duct is continuous between said inlet and said outlet.

18. The aircraft in accordance with claim 13 further comprising:
    a heat source positioned within said ram air duct, wherein said heat source is exposed to a cooling inlet flow within said ram air duct.

19. The aircraft in accordance with claim 13, wherein said lower lobe comprises a wing-to-body fairing of said aircraft.

20. The ram air system in accordance with claim 5, wherein the ram air duct further comprises an inlet configured to receive a first free stream airflow, wherein said at least one opening is defined in the exterior wall such that the interior volume is in flow communication with the exterior environment, said at least one opening configured to receive a second free stream airflow different from the first free stream airflow, wherein the cooling air is formed at least partially from the second free stream airflow.

* * * * *